(12) United States Patent
Matsuo et al.

(10) Patent No.: US 10,727,517 B2
(45) Date of Patent: Jul. 28, 2020

(54) SOLID OXIDE FUEL CELL

(71) Applicant: KABUSHIKI KAISHA TOYOTA CHUO KENKYUSHO, Nagakute-shi, Aichi-ken (JP)

(72) Inventors: Hidehito Matsuo, Nagakute (JP); Teruhisa Akashi, Nagakute (JP); Hirofumi Funabashi, Nagakute (JP); Hiroko Iguchi, Nagakute (JP); Shigeo Hori, Nagakute (JP); Toshihiko Tani, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 271 days.

(21) Appl. No.: 15/848,974

(22) Filed: Dec. 20, 2017

(65) Prior Publication Data

US 2018/0277874 A1  Sep. 27, 2018

(30) Foreign Application Priority Data

Mar. 24, 2017  (JP) .................. 2017-059320

(51) Int. Cl.
*H01M 8/124* (2016.01)
*H01M 8/1213* (2016.01)
(Continued)

(52) U.S. Cl.
CPC ....... *H01M 8/1273* (2013.01); *H01M 8/1213* (2013.01); *H01M 8/1246* (2013.01);
(Continued)

(58) Field of Classification Search
CPC .......... C01B 33/12; H01M 2008/1293; H01M 2250/30; H01M 8/1213; H01M 8/1246; H01M 8/1273; H01M 8/1286
See application file for complete search history.

(56) References Cited

U.S. PATENT DOCUMENTS

| | | | |
|---|---|---|---|
| 9,692,075 B1 * | 6/2017 | Lee ...................... | H01M 8/1226 |
| 2006/0189142 A1 * | 8/2006 | Saito ...................... | H01M 4/881 |
| | | | 438/694 |
| 2010/0285391 A1 * | 11/2010 | Higuchi .............. | H01M 4/8605 |
| | | | 429/483 |

FOREIGN PATENT DOCUMENTS

JP   2003-142123 A    5/2003
JP       4987703 B2    7/2012
(Continued)

OTHER PUBLICATIONS

May 28, 2019 Office Action issued in Japanese Patent Application No. 2017-059320.

*Primary Examiner* — Adam A Arciero
(74) *Attorney, Agent, or Firm* — Oliff PLC (57) ABSTRACT

A solid oxide fuel cell includes an Si support substrate having a through hole, an electrolyte film formed on the surface of an Si support substrate and containing a solid oxide having oxygen ion conductivity, a first electrode formed on a surface of the electrolyte film (surface on the side opposite to the Si support substrate), and a second electrode formed at least on a surface exposed from the through hole in a rear face of the electrolyte film. The electrolyte film includes a porous layer including the solid oxide and containing pores inside, a first dense layer formed on a surface of the porous layer (surface on the side opposite to the Si support substrate), and a second dense layer formed at the interface between a rear face of the porous layer and the Si support substrate.

4 Claims, 9 Drawing Sheets

(51) Int. Cl.
*H01M 8/1246* (2016.01)
*H01M 8/1286* (2016.01)
*C01B 33/12* (2006.01)

(52) U.S. Cl.
CPC ........... *H01M 8/1286* (2013.01); *C01B 33/12* (2013.01); *H01M 2008/1293* (2013.01); *H01M 2250/30* (2013.01)

(56) References Cited

FOREIGN PATENT DOCUMENTS

| | | | |
|---|---|---|---|
| JP | 2017-024931 | A | 2/2017 |
| WO | 2009/096399 | A1 | 8/2009 |

\* cited by examiner

SOLID OXIDE FUEL CELL

FIELD OF THE INVENTION

The present invention relates to a solid oxide fuel cell and, more specifically relates to a solid oxide fuel cell in which an electrolyte is composed of a solid oxide having a porous layer and a dense layer.

BACKGROUND OF THE INVENTION

A solid oxide fuel cell (SOFC) is a fuel cell using an oxide ion conductor as an electrolyte. The SOFC, as advantages thereof, (1) has high power generation efficiency, (2) can deal with a variety of fuels, (3) has broad adaptability ranging from a small-sized dispersed power source to a large scale system substituting thermal power plants, and (4) does not need a Pt catalyst.

However, lowering of an operation temperature (current operation temperature: 750° C.) is a key to wide use of the SOFC. Lowering of the operation temperature (for example, to 600° C.) enables (1) improvement of cell durability (chemical stability), (2) use of inexpensive casing (made of inexpensive stainless steel), and (3) shortening of start-stop time.

For attaining the purpose, various proposals have been made so far.

For example, Patent Literature 1 discloses a method of manufacturing a solid oxide electrolyte film including:
(a) depositing an electrolyte layer including yttria-stabilized zirconia (YSZ) on the surface of a silicon wafer coated with silicon nitride by using DC or RF magnetron sputtering;
(b) depositing a first electrode layer on the upper surface of the electrolyte layer;
(c) partially removing the silicon wafer by etching to expose a silicon nitride layer;
(d) removing the exposed silicon nitride layer thereby exposing the lower surface of the electrolyte layer; and
(e) forming a second electrode layer on the lower surface of the electrolyte layer.

Patent Literature 1 describes that
(A) a thin nano-scale electrolyte film is obtained by the method described above, and
(B) the SOFC can be operated at a low temperature by reducing the thickness of the electrolyte film.

For lowering the operation temperature of the SOFC, it is necessary to use a solid oxide having high oxygen ion conductivity even at a low temperature for the electrolyte film, or decrease the thickness of the electrolyte film. When an MEMS (Micro Electro Mechanical System) technique is used as described in Patent Literature 1, it is possible to manufacture an SOFC in which a thin film electrolyte including YSZ is formed on the surface of an Si substrate, that is, an SOFC having a diaphragm structure.

However, since the YSZ is an isotropic ion conductor, no improvement can be expected in the ion conductivity except for decreasing the thickness. Further, since the thickness of the electrolyte film is at a submicron order (10 to 200 nm), the electrolyte film tends to be cracked when the layer is formed to a diaphragm structure. Further, stress concentration caused by the difference of the linear expansion coefficient occurs in a support portion due to external disturbance such as upward and downward temperature fluctuation, tending to break the electrolyte diaphragm. Accordingly, it has been difficult to increase the diameter of the electrolyte diaphragm.

Further, the method described in Patent Literature 1 requires a deposition step of silicon nitride as a passivation film on a silicon substrate in view of the process. The silicon nitride film deposition step makes the manufacturing step longer to result in an increase of the manufacturing cost.

CITATION LIST

Patent Literature

[Patent Literature 1]
 Japanese Patent No. 4987703

SUMMARY OF THE INVENTION

An object of the present invention is to provide a solid oxide fuel cell capable of operating at a low temperature and having high reliability.

Another object of the present invention is to provide a solid oxide fuel cell free from breakage of an electrolyte film even when the temperature fluctuates upward and downward.

A further object of the present invention is to provide a solid oxide fuel cell capable of suppressing increase in the manufacturing cost.

The foregoing objects can be attained in accordance with a first aspect of the present invention.

(1) The solid oxide fuel cell comprises:
 an Si support substrate having a through hole;
 an electrolyte film formed on the surface of the Si support substrate and containing a solid oxide having oxygen ion conductivity;
 a first electrode formed on a surface of the electrolyte film (surface on the side opposite to the Si support substrate); and
 a second electrode formed at least on the surface exposed from the through hole in the rear face of the electrolyte film.

(2) The electrolyte film includes:
 a porous layer including the solid oxide and containing pores inside;
 a first dense layer formed on a surface of the porous layer (surface on the side opposite to the Si support substrate); and
 a second dense layer formed at the interface between the rear face of the porous layer and the Si support substrate.

When the electrolyte film having the porous layer and the dense layers is used for the electrolyte film of the SOFC, the porous layer absorbs stress even when external force exerts or temperature fluctuates upward and downward. As a result, the electrolyte film is retained from breakage. Further, since the thickness of the electrolyte film can be decreased with no breakage, operation at a low temperature is possible and the reliability is improved as well. Further, such an electrolyte film is obtained by spin-coating a solution containing alkoxide and applying a heat treatment. In this case, since a dense passivation film is formed at the interface between the Si support substrate and the electrolyte film, there is no need to deposit silicon nitride as a passivation film on the surface of the Si support substrate. Accordingly, an increase in the manufacturing cost can be suppressed.

DETAILED DESCRIPTION OF THE PREFERRED EMBODIMENT

A preferred embodiment of the present invention is to be described in detail below.

[1. Solid Oxide Fuel Cell]

Figure 1:
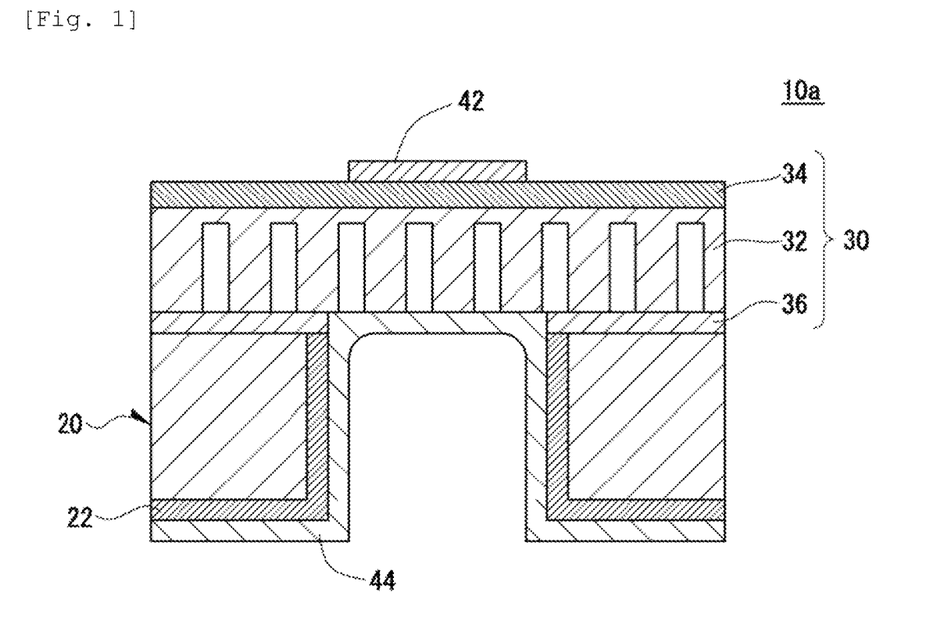
FIG. 1 is a schematic cross sectional view of a solid oxide fuel cell according to the present invention.

FIG. 1 shows a schematic cross sectional view of a solid oxide fuel cell (SOFC) according to the present invention. FIG. 1 is drawn partially in a size larger than the actual size so as to be easy to see. In FIG. 1, SOFC 10$a$ comprises:

an Si support substrate 20 having a through hole;

an electrolyte film 30 formed on the surface of the Si support substrate 20 and containing a solid oxide having oxygen ion conductivity;

a first electrode 42 formed on the surface of the electrolyte film 30 (surface on the side opposite to the Si support substrate 20); and a second electrode 44 formed at least on the surface exposed from the through hole in the rear face of the electrolyte film 30.

[1.1. Si Support Substrate]

The Si support substrate 20 serves to support the electrolyte film 30. A through hole for supplying a reaction gas (for example, fuel gas) to the electrolyte film 30 is formed about at the center of the Si support substrate 20. The size and the shape of the through hole are not particularly restricted and can be selected optimally depending on the purpose.

An insulation film 22 is preferably formed to the inner surface of the through hole. This is for avoiding the reaction of the Si support substrate 20 with other substances. The composition and the forming method of the insulation film 22 are not particularly restricted, and the insulation film 22 including $SiO_2$ can usually be formed to the inner surface of the through hole by applying oxidation treatment to the inner surface of the through hole.

[1.2. Electrolyte Film]

In the present invention, the electrolyte film 30 includes:
a porous layer 32 including a solid oxide having oxygen ion conductivity and containing pores inside, a first dense layer 34 formed on the surface of the porous layer 32 (surface on side opposite to the Si support substrate 20); and a second dense layer 36 formed at the interface between the rear face of the porous layer 32 and the Si support substrate 20. This is different from the conventional structure.

[1.2.1 Porous Layer]

[A. Composition of the Porous Layer]

The porous layer 32 includes a solid oxide having oxygen ion conductivity. The composition of the solid oxide constituting the porous layer 32 is not particularity restricted. The solid oxide may have isotropic oxygen ion conductivity or anisotropic oxygen ion conductivity.

Particularly, the porous layer 32 preferably includes a solid oxide having anisotropic oxygen ion conductivity. In a case of using a solid oxide having anisotropic oxygen ion conductivity for the porous layer 32, when the crystal orientation of high oxygen ion conductivity is oriented to the direction of the film thickness, the oxygen ion conductivity in the direction of the film thickness can be improved.

The solid oxides constituting the porous layer 32 includes, for example:

(a) lanthanum silicate oxyapatite (LSO);

(b) stabilized zirconia ($Y_2O_3$ stabilized $ZrO_2$ (YSZ), $Sc_2O_3$ stabilized $ZrO_2$ (SSZ), etc.);

(c) lanthanum gallate ($LaGaO_3$); and (d) gadolinium-doped ceria (GDC) solid solution.

Of them, the apatite-type LSO ($La_xSi_6O_{12+1.5x}$, $8 \leq x \leq 10$) has higher oxygen ion conductivity in the c-axis direction than in the vertical direction to the c-axis. Further, the c-axis can be oriented in the direction of the film thickness by using the method to be described later. Accordingly, the c-axis oriented apatite-type LSO is suitable as a solid oxide constituting the porous layer 32.

[B. Orientation Factor]

The degree of orientation in a particular crystal orientation can be expressed by a Lotgering factor (F). "Lotgering factor (F)" is a value represented by the following equation (1)

$$F=(p-p_0)/(1-p_0) \qquad (1)$$

where p is a ratio ($=\Sigma 1(001)/\Sigma 1(hkl)$) of total ($=\Sigma 1(001)$) of X-ray diffraction peak intensity at a specific crystal plane (for example, (001) plane) to total ($=\Sigma 1(hkl)$) of X-ray diffraction peak intensity at all (hkl) planes of a target sample (that is, oriented sample), and $p_0$ is a p value for the non-oriented sample.

In a case where the oxygen ion conductivity is anisotropic, when the crystal orientation of high oxygen ion conductivity is oriented in the direction of the film thickness, the oxygen ion conductivity in the direction of the film thinness is improved.

[C. The Size and the Volume Fraction of Pores]

The porous layer 32 has pores (fine pores). The size and the volume fraction of the pore give an effect on the mechanical property of the electrolyte film 30.

Generally, if the size of the pores is excessively small, stress relaxation is insufficient.

On the other hand, if the size of the pores is excessively large, the strength of the electrolyte film 30 is lowered.

Generally, if the volume fraction of the pores is excessively small, stress relaxation is insufficient. Accordingly, the volume fraction of the pores is preferably 10% or more.

On the other hand, when the volume fraction of the pores is excessively large, the strength of the electrolyte film 30 is lowered.

[D. Thickness of the Porous Layer]

Generally, when the thickness of the porous layer 32 is excessively thin, the strength of the electrolyte film 30 is lowered. Accordingly, the thickness of the porous layer 32 is preferably 20 nm or more.

On the other hand, when the thickness of the porous layer 32 is excessively thick, the electric resistance is increased and the output is lowered. Accordingly, the thickness of the porous layer 32 is preferably 30 μm or less.

[1.2.2 First Dense Layer]

[A. Composition of the First Dense Layer]

The first dense layer 34 is formed on the surface of the porous layer 32 (surface on the side opposite to the Si support substrate 20). The electrolyte film 30 serves to isolate the fuel gas and the oxidizer gas and, concurrently, conduct oxygen ions from the cathode to the anode. The composition of the first dense layer 34 is not particularly restricted so long as it does not hinder the function of the electrolyte film 30. That is, the first dense layer 34 may be made of a material identical with that of the porous layer 32, or may be a material different therefrom.

The first dense layer 34 preferably includes a solid oxide containing an element identical with that contained in the porous layer 32. In this case, the proportion of the element contained in the first dense layer 34 may be identical with or different from that of the porous layer 32.

As will be described later, when a precursor film is formed on the surface of the Si support substrate 20 and the precursor film is heat-treated under predetermined conditions, an electrolyte film 30 which is porous inside and dense only at the surface is obtained. In this case, since the first dense layer 34 includes the material substantially identical with that of the porous layer 32 except that their porosities are different, the oxygen ion conductivity to the electrolyte film 30 is not lowered.

[B. Porosity]

It is necessary that the electrolyte film 30 not only contains the solid oxide having oxygen ion conductivity but also has a density to such an extent as capable of cutting off gas permeation. In the present invention, the gas is cut off by the first dense layer 34. Accordingly, smaller porosity is better for the first dense layer 34.

In order to prevent the gas from cross leaking, the porosity of the first dense layer 34 is preferably 10% or less. The porosity of the first dense layer 34 is preferably 5% or less and, more preferably, 1% or less.

[C. Thickness of the First Dense Layer]

The thickness of the first dense layer 34 gives an effect on the gas permeability of the electrolyte film 30. The thickness of the first dense layer 34 is preferably as thin as possible so long as the gas cross leakage is not caused.

[1.2.3. Second Dense Layer]

[A. Composition of Second Dense Layer]

The second dense layer 36 is formed at the interface between the rear face of the porous layer 32 and the Si support substrate 20. The second dense layer 36 serves to protect the Si support substrate 20. The composition of the second dense layer 36 is not particularly restricted so long as the function of the electrolyte film 30 is not hindered.

The second dense layer 36 particularly preferably includes $SiO_2$. As will be described later, when a precursor film is formed on the surface of the Si support substrate 20 and heat-treated under predetermined conditions, the porous layer 32 and the first dense layer 34 are formed, and concurrently, the surface of the Si support substrate 20 is oxidized to obtain a second dense layer 36 including $SiO_2$.

[B. Porosity]

For the second dense layer 36, smaller porosity is better. This is for avoiding the Si support substrate 20 from reacting with other substance. In order to provide such a function, the porosity of the second dense layer 36 is preferably 10% or less. The porosity of the second dense layer 36 is preferably 5% or less, and more preferably, 1% or less.

[C. Thickness of the Second Dense Layer]

Generally, when the thickness of the second dense layer 36 is excessively thin, reaction of the Si support substrate 20 with other substances cannot be prevented. Accordingly, the thickness of the second dense layer 36 is preferably 20 nm or more. The thickness of the second dense layer 36 is preferably 50 nm or more.

On the other hand, when the thickness of the second dense layer 36 is excessively thick, the cost for the etching step is increased. Accordingly, it is not necessary to increase the thickness to more than the necessary thickness in view of the specification of the fuel cell.

[1.3. First Electrode]

The first electrode 42 is formed on the surface of the electrolyte film 30 (surface on the side opposite to the Si support substrate 20). The first electrode 42 may be formed on the entire surface of the electrolyte film 30, or formed partially (for example, only on a portion located above the through hole formed in the Si support substrate 20).

The material for the first electrode 42 is not particularly restricted and various materials can be used depending on the purpose. The material of the first electrode 42 includes, for example, a porous Pt film and a perovskite type oxide.

[1.4. Second Electrode]

The second electrode is formed at least on the surface exposed from the through hole in the rear face of the electrolyte film 30. It is necessary to bond a lead wire for taking out the output to the second electrode 44. Accordingly, the second electrode 44 is preferably formed not only on the rear face of the electrolyte film 30 but also on the inner surface of the through hole and the rear face of the Si support substrate 20.

The material for the second electrode 44 is not particularly restricted and various materials can be used depending on the purpose. The material for the second electrode 44 includes, for example, porous Pt film and Ni, Co, Pd, and Ru having good affinity with hydrogen and alloys containing them.

[2. Method of Manufacturing Electrolyte Film]

In the present invention, the electrolyte film 30 comprises the porous layer 32, the first dense layer 34, and the second dense layer 36. The electrolyte film 30 having such a structure can be manufactured by:

(a) preparing a coating solution for forming the electrolyte film 30;

(b) coating the coating solution on the surface of the Si support substrate 20 to prepare a precursor film; and (c) subjecting the precursor film to a heat treatment for crystallization.

[2.1. Coating Solution Preparation Step]

First, a coating solution containing a metal element that constitutes the electrolyte film 30 is prepared (coating solution preparing step). A source of the metal element is not particularly restricted so long as it is a compound soluble to a solvent. The source for the metal element includes, for example:

(a) alkoxide such as $Si(OC_2H_5)_4$ (TEOS);

(b) inorganic salt such as $La(NO_3)_3$; and (c) tetra-i-propoxy zirconium: $(Zr(O\text{-}i\text{-}C_3H_7)_4)$, tri-i-propoxy yttrium $(Y(O\text{-}i\text{-}C_3H_7)_3)$, etc.

A proportion of the metal element contained in the coating solution, pH of the coating solution, a concentration of the metal element of the coating solution, etc. are preferably selected to be optimal values depending on the purpose.

For example, when the electrolyte film 30 includes an apatite-type LSO, it is preferred that an La source and an Si source are blended such that La:Si (molar ratio)=4:3 to 5:3 and the pH of the coating solution is adjusted to 3.5 to 7.

[2.2. Precursor Film Preparing Step]

Then, a coating solution is coated on the surface of the Si support substrate 20 to prepare a precursor film (precursor film preparation step). The coating method of the coating solution is not particularly restricted. The coating method includes, for example, dipping and spin coating. For example, in a case of LSO, after coating the coating solution, the coating film is subjected to heat treatment at 350 to 600° C. to obtain an LSO precursor.

Coating and heat treatment of the coating solution may be performed only once or may be repeated several times. By controlling the number of repetition, the thickness of the precursor film can be controlled.

[2.3. Crystallization Step]

Next, the precursor film is heat-treated and crystallized (crystallization step). Thus, the precursor film is transformed to a porous film 32 and a first dense layer 34, and simultaneously, a second dense layer 36 is formed at the interface between the precursor film and the Si support substrate 20.

For the heat treatment temperature, an optimal condition is selected in accordance with the composition of the electrolyte film 30. Generally, when the heat treatment temperature is excessively low, crystallization is insufficient. On the other hand, when the heat treatment temperature is excessively high, the entire electrolyte film 30 becomes dense layer and the porous layer 32 is not formed. The optimal heat treatment temperature is different depending on the composition of the electrolyte film 30. For example, when the electrolyte film 30 includes an apatite-type LSO, the heat treatment temperature is preferably 800° C. to 1200° C.

[3. Manufacturing Method of Solid Oxide Fuel Cell]

The solid oxide fuel cell according to the present invention can be manufactured by using an MEMS technique. FIG. 2A to FIG. 3D show flow charts for a method of manufacturing the solid oxide fuel cell according to the present invention (MEMS type SOFC). In the following example, although an example of using the apatite-type LSO as the electrolyte film 30 is explained, even when electrolyte film 30 is made of other materials, the fuel cell can be manufactured by the same method as described below.

[3.1. Step 1 (FIG. 2A): Manufacture of LSO Precursor Film]

Figure 2A:
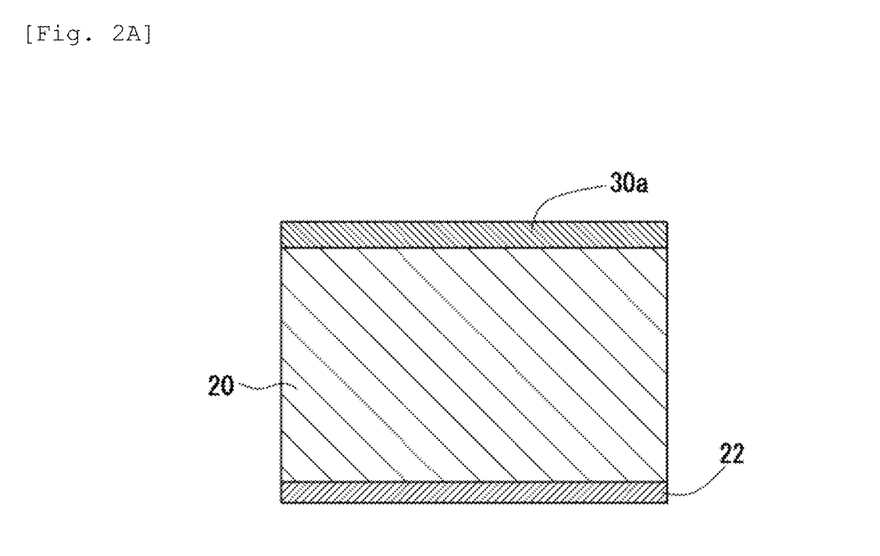
FIGS. 2A to 2D are flow charts for the manufacturing method of a solid oxide fuel cell according to the present invention.

An Si support substrate (Si wafer) 20 is prepared and an insulation film (silicon oxide film) 22 is deposited to the rear face of the Si support substrate 20 by using plasma CVD.

Next, an LSO precursor film 30a is formed by a sol-gel method on the surface of the Si support substrate 20. In this case, a coating solution for forming the LSO precursor film 30a is spin-coated on the surface of the Si support substrate 20, for example, at 1500 rpm, for 30 seconds. For the coating solution, a solution mixture of lanthanum nitrate, water, ethanol, and TEOS is used preferably. Further, after the spin coating, prebaking is applied preferably at 400° C.×2 minutes over a hot plate to form an LSO precursor film 30a. When the film thickness is increased, spin coating and prebaking are repeated preferably for plurality of times.

[3.2. Step 2 (FIG. 2B): Crystallization of LSO Precursor Film]

Figure 2B:
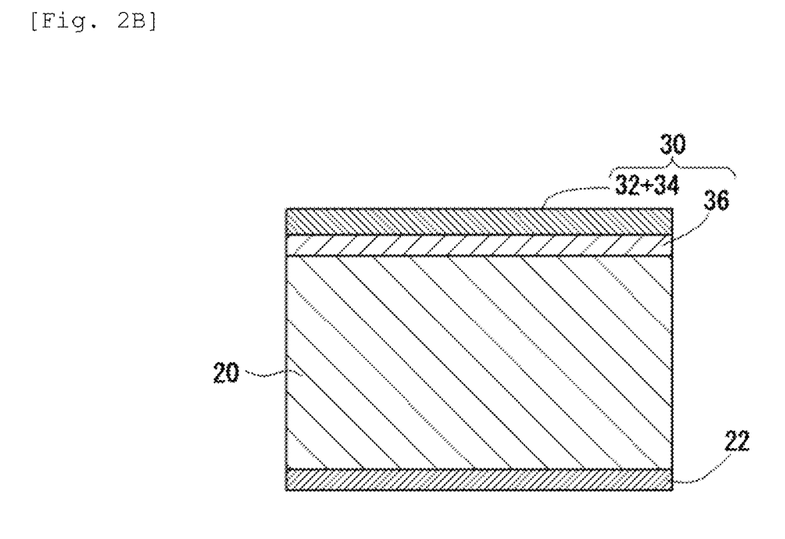

Then, after forming the LSO precursor film 30a, the Si support substrate 20 is charged in a muffle furnace and baked in the atmosphere within a range of 800 to 1100° C. for 2 hours. Thus, the LSO precursor film 30a is crystallized to form an LSO film (porous layer 32+first dense layer 34). Further, an oxide film $(SiO_2)$ (second dense layer 36) is formed by baking at the interface between the LSO film 32+34 and the Si support substrate 20. That is, the electrolyte film 30 including the porous layer 32, the first dense layer 34, and the second dense layer 36 is formed by baking.

[3.3. Step 3 (FIG. 2C): Resist Mask Pattern Formation]

Figure 2C:
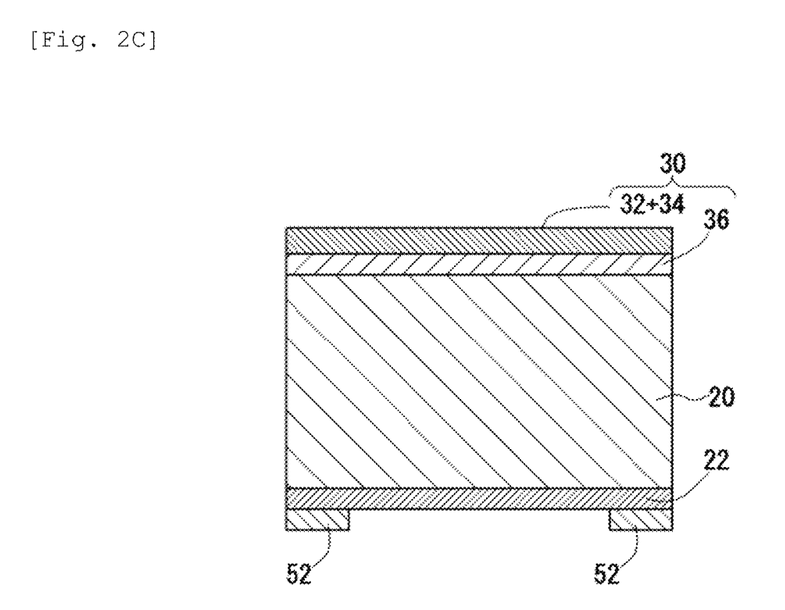

A resist mask pattern 52 of 1 μm in thickness is formed on the surface of the insulation film 22 formed on the rear face of the Si support substrate 20. The resist mask pattern 52 serves to form a trench through hole by photolithography.

[3.4. Step 4 (FIG. 2D): DRIE]

Figure 2D:
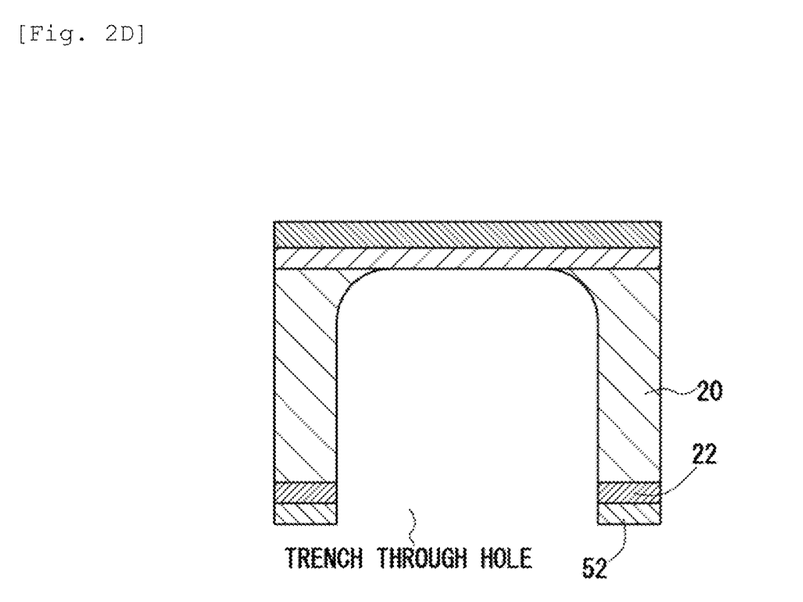

Then, RIE is applied to the insulation film 22 by using the resist mask pattern 52 to remove the insulation film 22 not coated with the resist mask pattern 52. Then, without removing the resist mask pattern 52, deep reaction ion etching (DRIE) is applied to the Si support substrate 20 by using a two-layer pattern of the resist mask pattern 52 and the insulation film 22 therebelow as a mask. DRIE is a cyclic process of repeating formation of deposition film and etching, which is anisotropic dry etching of forwarding etching in the thickness direction while protecting the side wall with the deposition film. A deposition film of about several nm in thickness (not illustrated) is formed on the lateral surface of the trench through hole after DRIE.

[3.5. Step 5 (FIG. 3A): Removal of Second Dense Layer (Oxide Film)]

Figure 3A:
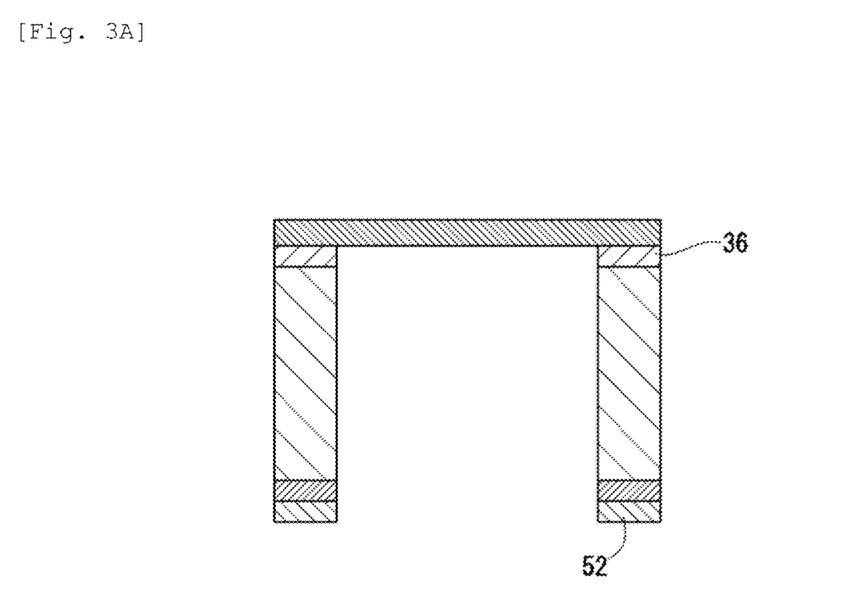
FIGS. 3A to 3D are continuation of the flow charts shown in FIGS. 2A to 2D.

Then, the second dense layer (oxide film) 36 exposed by DRIE is removed by etching. A deposition film (not illustrated) is kept formed on the side wall of the trench through hole even after this step.

[3.6. Step 6 (FIG. 3B): Removal of Resist Mask Pattern]

Figure 3B:
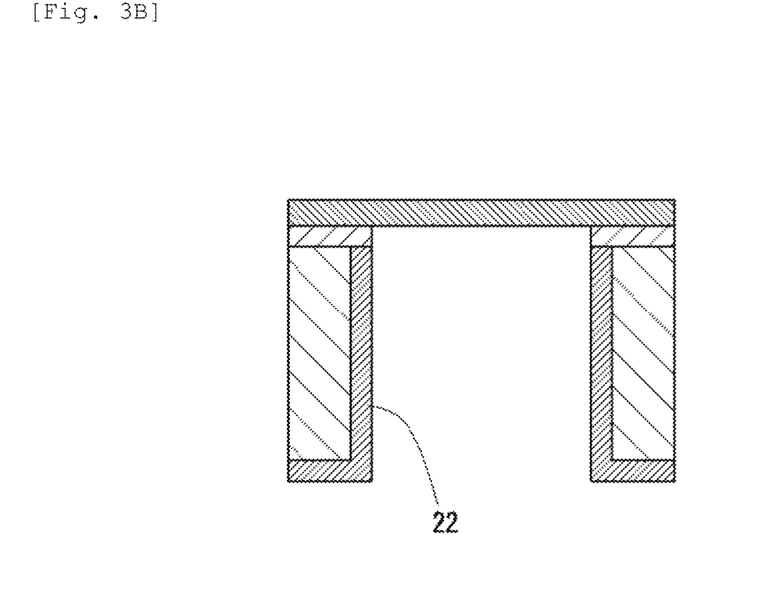

Then, the deposition film on the side wall and the resist mask pattern 52 are removed by oxygen plasma ashing. When the ashing step is longer, an insulation film (silicon oxide film) 22 with a thickness of 10 nm or less is formed on the side wall after removing the deposition film on the side wall. The insulation film 22 is formed on the side wall for protecting the Si support substrate 20.

[3.7. Step 7 (FIG. 3C): Formation of First Electrode]

Figure 3C:
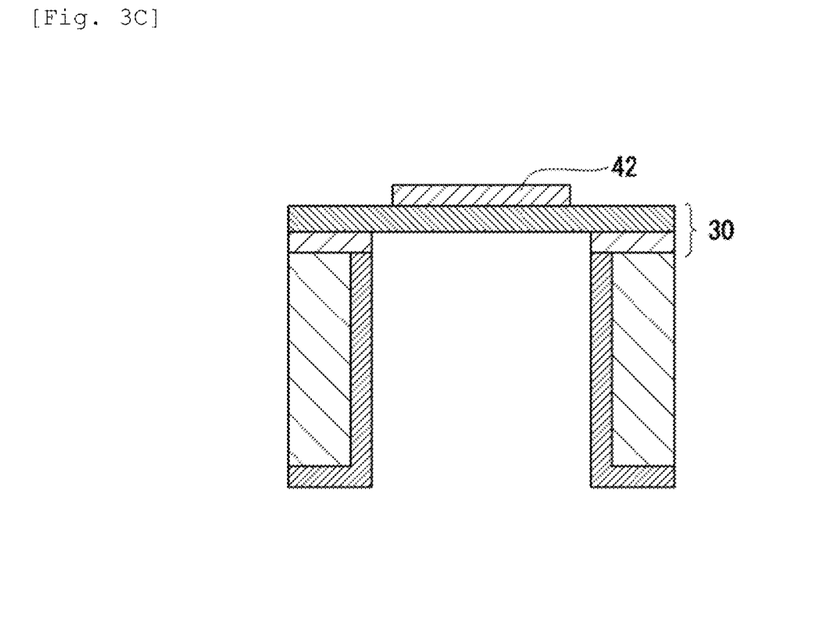

Then, a porous Pt film of about several tens nm in thickness (first electrode 42) is deposited on the surface of the electrolyte film 30 by vapor deposition. In this case, the first electrode 42 is formed to a necessary portion on the surface of the electrolyte film 30 by using a metal mask method. The method of forming the first electrode 42 is not restricted only to the vapor deposition method and any other method (for example, sputtering method) may be used.

[3.8. Step 8 (FIG. 3D): Formation of Second Electrode]

Figure 3D:
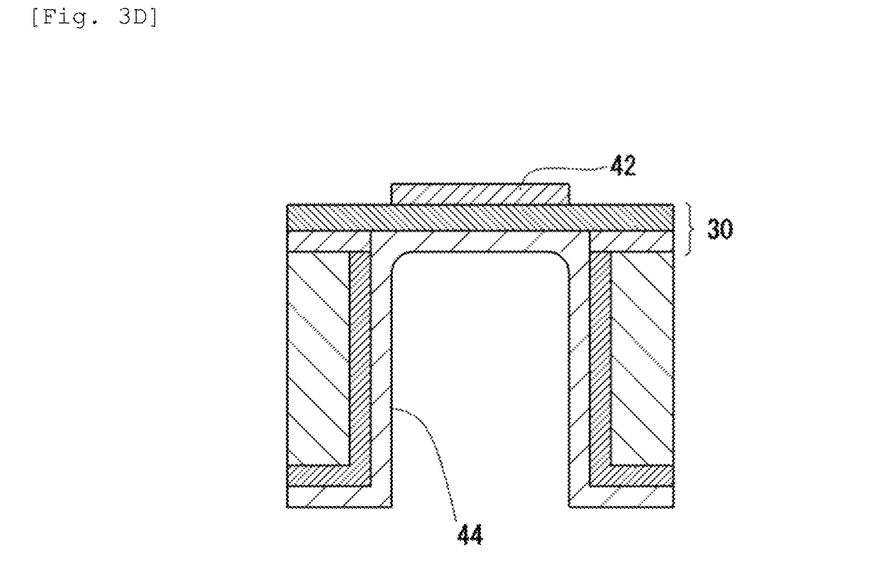

Then, a porous Pt film of about several tens nm in thickness (second electrode 44) is deposited on the rear face of the electrolyte film 30 by vapor deposition. In this step, the second electrode 44 is formed not only on the rear face of the electrolyte film 30 but also on the inner surface of the trench through hole by using the metal mask method.

Further, although not illustrated in the drawing, wiring or an electrode pad for current collection may also be formed. A method of forming the wiring or the electrode pad for current collection includes, for example, a metal mask method and an etching method using photolithography.

[4. MEMS Type SOFC Having Gas Flow Channel]

[4.1. Constitution]

Figure 4:
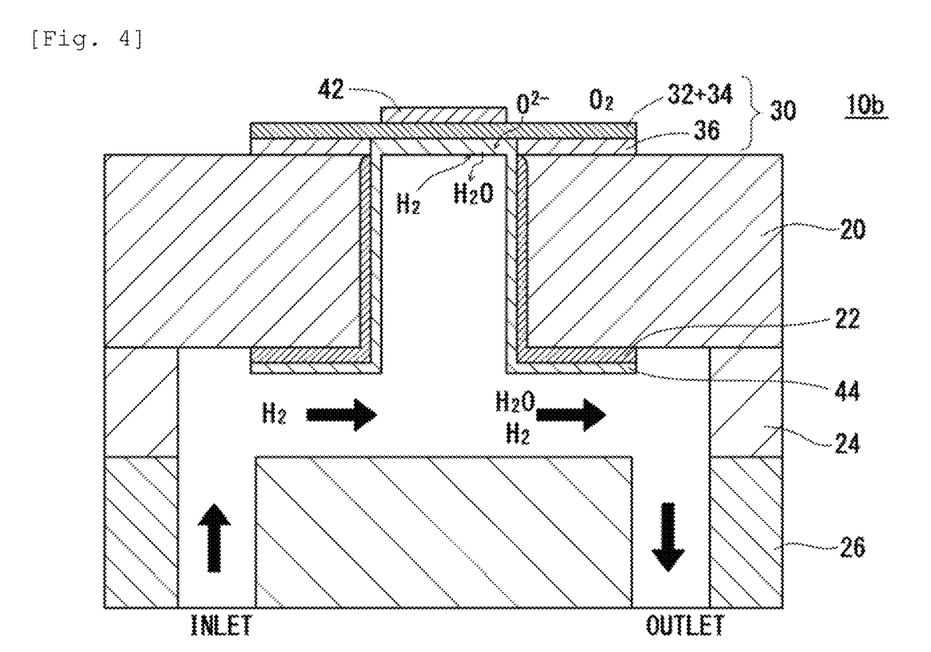
FIG. 4 is a schematic cross sectional view of an MEMS type SOFC having a gas flow channel.

FIG. 4 shows a schematic cross sectional view of an MEMS type SOFC having a gas flow channel. In FIG. 4, the MEMS-type SOFC 10b includes:

an Si support substrate 20 having a through hole;

an electrolyte film 30 containing a solid oxide having oxygen ion conductivity formed on the surface of the Si support substrate 20;

a first electrode 42 formed on the surface of the electrolyte film 30;

a second electrode 44 formed at least on the surface exposed from a through hole in the rear face of the electrolyte film 30;

a first Si substrate 24 for forming the flow channel; and a second Si substrate 26 for forming the flow channel.

[4.1.1. Si Support Substrate, Electrolyte Film, First Electrode, and Second Electrode]

Since details for the Si support substrate 20, the electrolyte film 30, the first electrode 42, and the second electrode 44 are identical with those of the SOFC 10a illustrated in FIG. 1, the explanations thereof are omitted.

[4.1.2. First Si Substrate, Second Si Substrate]

The first Si substrate 24 is bonded to the lower surface of the Si support substrate 20. Further, a second Si substrate 26 is bonded to the lower surface of the first Si substrate 24. The first Si substrate 24 and the second Si substrate 26 serve to form the flow channel of a fuel gas. The first Si substrate 24 is perforated inside while keeping the outer wall portion. On the other hand, in the second Si substrate 26, through holes are formed at the inlet and the outlet of the fuel gas.

For the first Si substrate 24 and the second Si substrate 26, a non-doped high resistance Si substrate is used preferably. A bonding method of the first Si substrate 24 and the second Si substrate 26 is not particularly restricted and various methods can be used. The bonding method includes, for example, an Si direct bonding method, an OH group bonding method, a eutectic bonding method.

[4.2. Method of Use]

Hydrogen coming in from the inlet of the second Si substrate 26 is guided through a gas flow channel in the first Si substrate 24 to a trench through hole. On the other hand, the periphery of the first electrode 42 is exposed to the atmosphere. Then, oxygen in the atmosphere goes into the porous first electrode 42 and reaches the surface of the electrolyte film 30. Oxygen reaching the surface changes to oxide ions ($O^{2-}$) at the first electrode 42 that serves as a catalyst on the surface of the electrolyte film 30. The oxide ions pass through the electrolyte film 30 and reach the rear face of the electrolyte film 30, where hydrogen and oxide ions are reacted to form water, and release electrons at the same time.

The formed water is discharged through the outlet of the gas flow channel to the outside together with hydrogen not contributing to the reaction. On the other hand, the released electrons pass through the second electrode 44 formed also on the side wall of the trench through hole, reach the rear face of the Si support substrate 20, and are collected to an electrode pad (not illustrated) bonded to the second electrode 44. Reaction of the fuel cell occurs by the mechanism as described above.

[5. MEMS Type SOFC System]

[5.1. Constitution]

Figure 5:
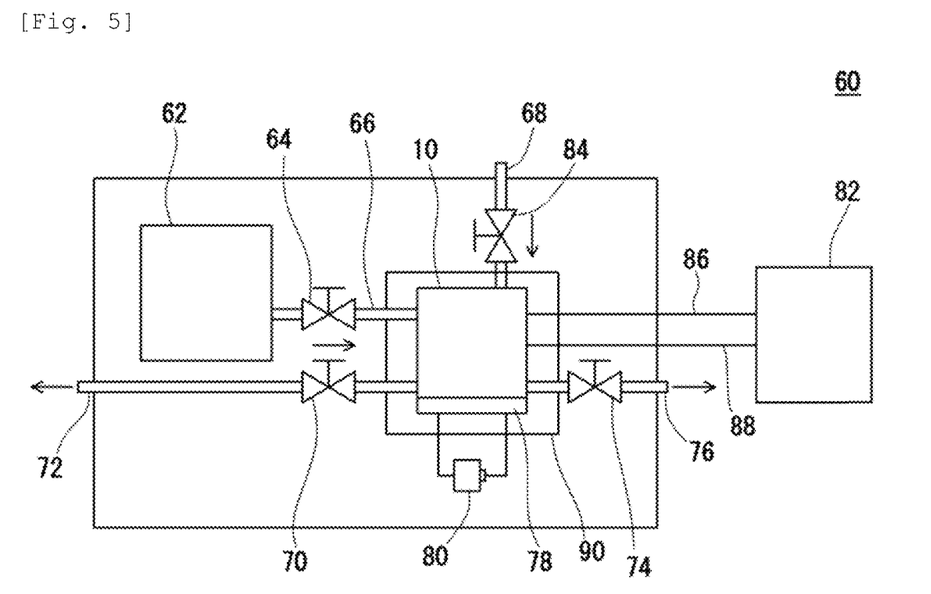
FIG. 5 is a schematic view of an MEMS type SOFC system.

FIG. 5 illustrates a schematic view of an MEMS type SOFC system. In FIG. 5, an MEMS type SOFC system 60 includes:

a solid oxide fuel cell (SOFC) 10 having a gas flow channel (not illustrated) inside;

a hydrogen gas cartridge 62 storing hydrogen;

a heater 78 for heating the SOFC 10;

a small-sized battery 80 for supplying electric power to a heater 78; and a target load 82 consuming the electric power generated from the SOFC 10.

Since details of the SOFC 10 are identical with those of the SOFC 10a illustrated in FIG. 1 or the SOFC 10b illustrated in FIG. 4, the explanation thereof is omitted.

The hydrogen cartridge 62 is connected by way of a pressure reducing valve 64 and a fuel inlet 66 to the inlet of an anode (not illustrated) of the SOFC 10. The outlet of the anode is connected by way of a fuel check valve 70 to an outlet 72. The fuel check valve 70 serves to keep hydrogen taken into the anode in the anode for a certain period. Fuel not contributing to the reaction and steam formed through reaction are adapted to be discharged from the outlet 72.

An air inlet 68 is connected by way of an on-off valve 84 to the inlet of a cathode (not illustrated) of the SOFC 10. The outlet of a cathode is connected by way of a check valve 74 to an outlet 76. The check valve 74 serves to keep the air taken into the cathode in the cathode for a certain period. The air after the reaction is adapted to be discharged from the outlet 76.

The heater 78 is disposed in adjacent with the SOFC 10. The heater 78 serves to elevate the temperature of the SOFC 10 to an operation temperature (500 to 700° C.) upon starting. The electric power for heating the heater 78 is supplied from the small-sized battery 80. After starting, when a predetermined time is elapsed, the SOFC 10 per se generates heat and is maintained at an appropriate operation temperature. Accordingly, after the temperature of the SOFC 10 rises to an operation temperature, heating by the heater 78 is not necessary.

The target load 82 is connected by way of output lines 86, 88 to the SOFC 10. The output lines 86, 88 serve to supply the electric power generated in the SOFC 10 to the target load 82. The target load 82 is not particularly restricted and varies depending on the target application to which the present invention is utilized. Further, a heat sink 90 for discharging excess heat from the SOFC 10, or a pump (not illustrated) for supplying air efficiently to the SOFC 10 may also be provided optionally.

[5.2. Method of Use]

Hydrogen is sealed at a pressurized state in a hydrogen gas cartridge 62. When a pressure reducing valve 64 is opened, hydrogen is supplied by way of the fuel inlet 66 to the anode of the SOFC 10. When the hydrogen is fully charged to the anode, the fuel check valve 70 is closed and the pressure reducing valve 64 is also closed. On the other hand, by opening the on-off valve 84, air is supplied to the cathode of the SOFC 10. When the air is fully charged in the cathode, the on-off valve 84 is closed and the check valve 74 is also closed.

Next, electric power is supplied from the small-sized battery 80 to the heater 78 to heat the SOFC 10. When the SOFC 10 reaches a predetermined temperature (for example, 600° C.), chemical reaction occurs in the SOFC 10 to initiate power generation. Since the chemical reaction along with power generation is an exothermic reaction, the temperature of the SOFC 10 per se elevates even when the heater 78 is turned off and a desired temperature can be maintained. A heat sink 90 may be provided optionally for heat dissipation such that the temperature of the SOFC 10 does not increase excessively.

Then, the fuel check valve 70 and the check valve 74 are opened to discharge a gas not contributing to the reaction and steam formed during reaction is discharged from the SOFC 10. Then, the pressure reducing valve 64 and the on-off valve 84 are opened again to supply fresh hydrogen and air to the SOFC 10 to continue the chemical reaction. The power generation is thus promoted and the electric power generated from the SOFC 10 is supplied through the output lines 86, 88 to the target load 82.

The MEMS type SOFC 60 illustrated in FIG. 5 has a single SOFC 10, but a plurality of SOFCs 10 may be electrically connected in series in the structure.

[5.3. Application Use]

[5.3.1. Mobile Charger]

Figure 6:
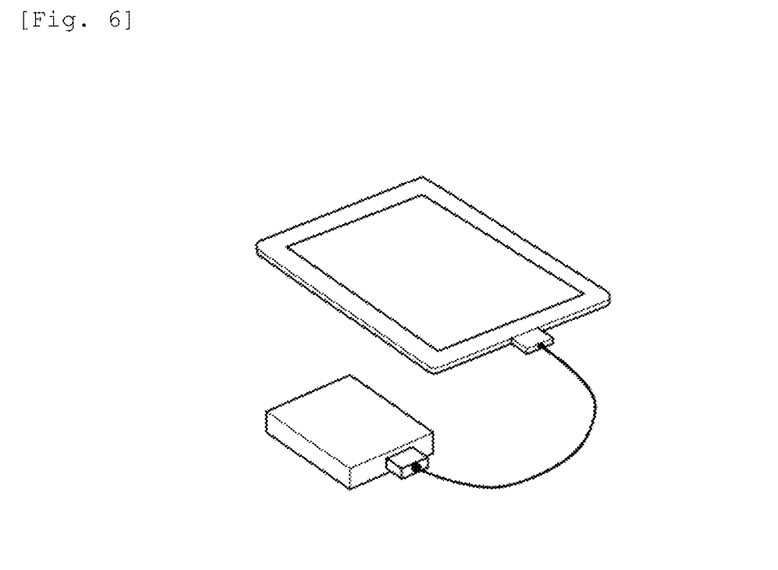
FIG. 6 is a schematic view of mobile equipment to which a solid oxide fuel cell according to the present invention is applied.

FIG. 6 illustrates a schematic view of mobile equipment to which the solid oxide fuel cell according to the present invention is applied. Electric power is supplied by using the MEMS type SOFC 60 illustrated in FIG. 5 to a battery attached to the mobile equipment to perform charging. The MEMS type SOFC 60, the battery, and the load built in the mobile equipment are electrically connected in parallel. Not only the electric power is charged by the MEMS type SOFC 60 but also the mobile equipment can be operated while charging the battery by the MEMS type SOFC 60 by means of an internal change-over switch (not illustrated).

[5.3.2. Small Mobility]

Figure 7:
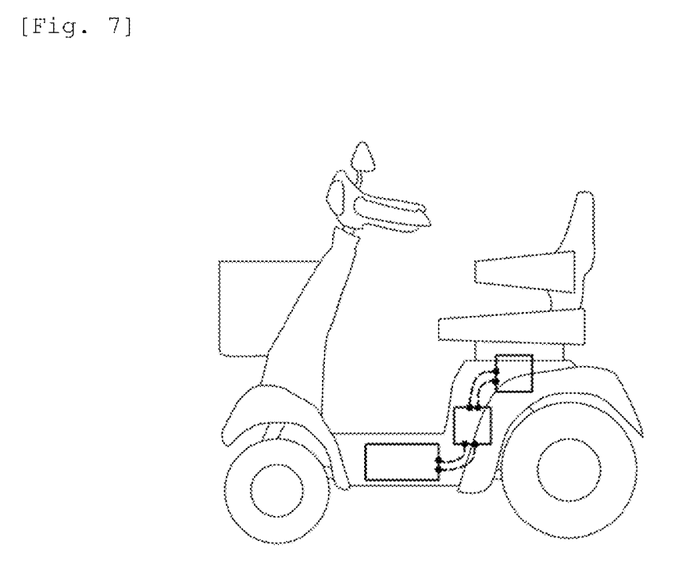
FIG. 7 is a schematic view of a small mobility to which a solid oxide fuel cell according to the present invention is applied.

FIG. 7 illustrates a schematic view of a small mobility to which the solid oxide fuel cell according to the present invention is applied. FIG. 7 illustrates an example applied to a charger of a mobility scooter recognized generally as transporting means of aged persons. Electric power is supplied to a battery attached to a mobility scooter by using the MEMS type SOFC 60 shown in FIG. 5, to perform charging. Then, a motor for driving wheels is operated by the electric power of the charged battery. The MEMS type SOFC 60, the battery, and the motor are electrically connected in parallel. Not only the electric power can be charged by the MEMS type SOFC 60 but also the motor can be operated while charging the battery by the MEMS type SOFC 60 by means of an internal change-over switch (not illustrated). Depending on the case, the motor may be driven directly by the MEMS type SOFC 60.

[5.3.3 Walk Assist Robot]

Figure 8:
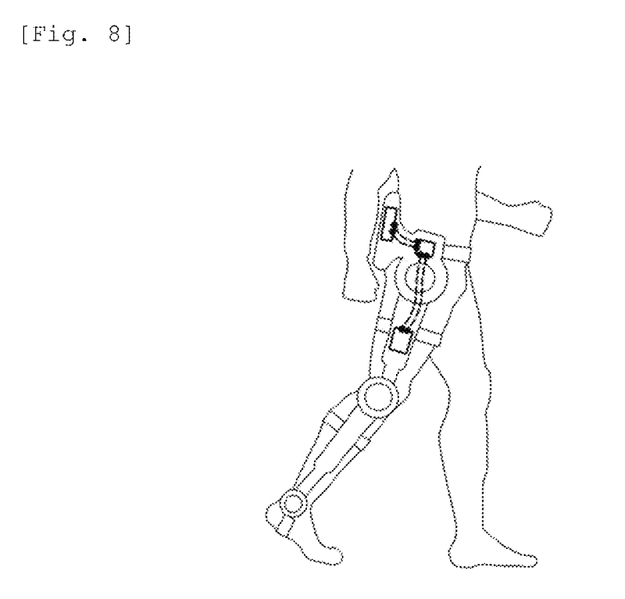
FIG. 8 is a schematic view of a walk assist robot to which a solid oxide fuel cell according to the present invention is applied.

FIG. 8 illustrates a schematic view of a walk assist robot to which the solid oxide fuel cell of the present invention is applied. Electric power is supplied by the MEMS type SOFC 60 illustrated in FIG. 5 to a battery incorporated in the walk assist robot to perform charging. Then, the motor is operated by the electric power of the charged battery so as to assist a portion where the muscle strength is reduced or muscle movement is uneasy. In this way, a walk assist function is provided. The MEMS type SOFC 60, the battery, and the motor are electrically connected in parallel. Not only the electric power can be charged by the MEMS type SOFC 60 but also the motor can be operated while charging the battery by the MEMS type SOFC 60 by means of an internal change-over switch (not illustrated). Depending on the case, the motor may be driven directly by the MEMS type SOFC 60.

[6. Effect]

Figure 9:
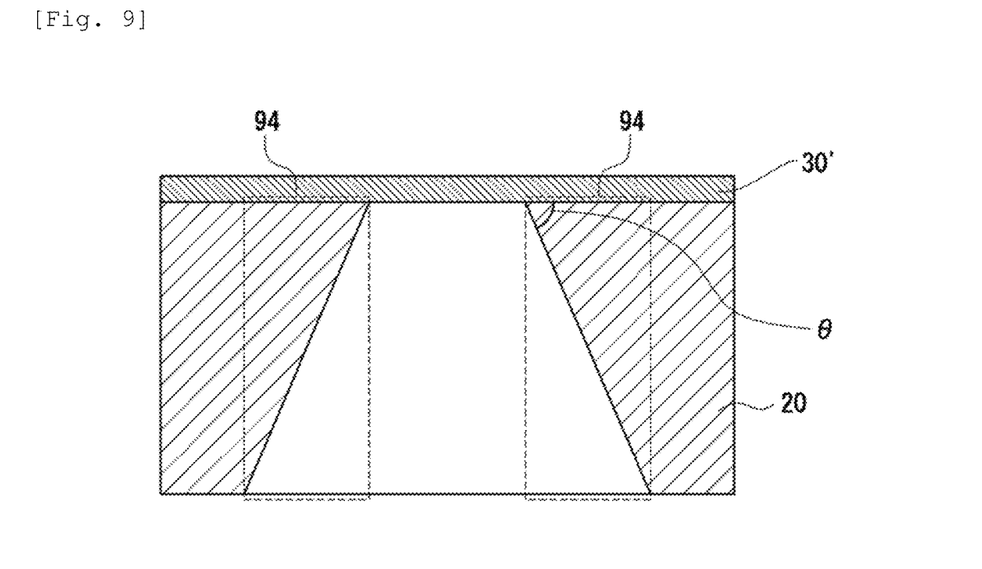
FIG. 9 is a schematic cross sectional view of a conventional electrolyte diaphragm support structure manufactured by using an anisotropic wet etching method.

FIG. 9 illustrates a schematic cross sectional view of a conventional electrolyte diaphragm support structure manufactured by using an anisotropic wet etching method. A thin electrolyte film 30' is formed on the surface of an Si support substrate 20. The Si support substrate 20 is manufactured by using a silicon wafer having a plane orientation (100). A through hole of a shape having a slope at $\theta=54.7$ deg is formed by anisotropic wet etching of Si using a wet etching solution such as KOH or TMAH at the rear face of the Si support substrate 20. Although not illustrated, the shape of the opening of the through hole is rectangular as viewed from the upper surface.

In the Si anisotropic etching, an angle at $\theta=54.7$ deg cannot be obtained unless the shape of the opening is rectangular. Due to the presence of the angle, dead spaces 94, 94 surrounded by broken lines are formed in FIG. 9. By the presence of the dead spaces 94, 94, a large area is necessary in a case of preparing a plurality of diaphragm integrated structures. Accordingly, this is a configuration not suitable to integration. Referring to the MEMS type SOFC, a structure of higher reliability can be obtained by arranging a plurality of diaphragm structures each of a small area, which is not liable to be broken, so as to form the same area, rather than by preparing a diaphragm structure of one large area, which is liable to be broken mechanically.

Figure 10:
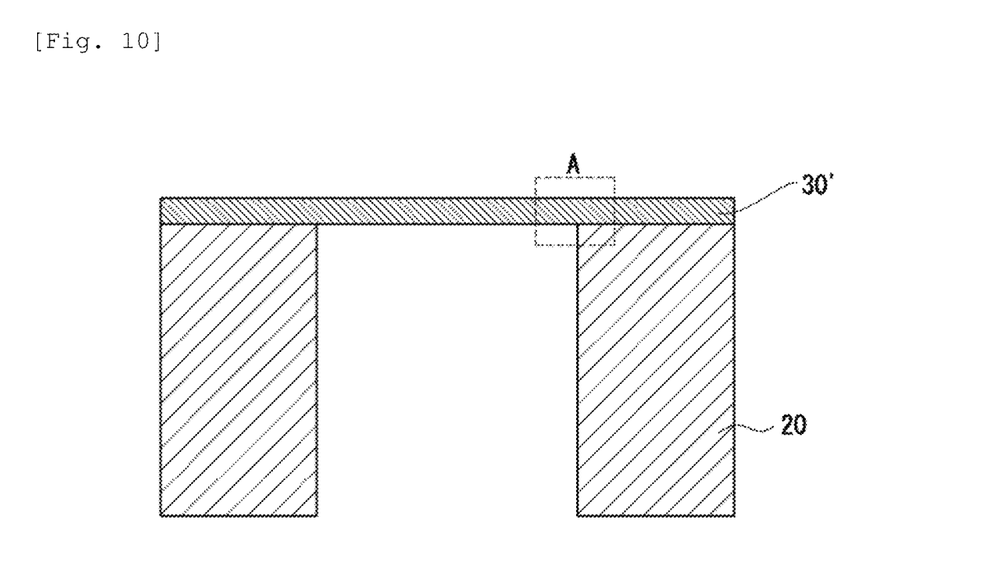
FIG. 10 is a schematic cross sectional view of a conventional electrolyte diaphragm support structure manufactured by using a Deep RIE (DRIE) method.

FIG. 10 illustrates a schematic cross sectional view of a conventional diaphragm support structure manufactured by using a deep RIE (DRIE). A thin electrolyte film 30' is formed on the surface of the Si support substrate 20. The plane orientation of the Si support substrate 20 is not particularly restricted in this case. DRIE is_a method of processing an Si wafer by dry etching using plasmas. When the Si support substrate 20 is etched from the side of the rear face by using DRIE, the through hole has a trench structure as shown in FIG. 10. DRIE is referred to also as a Bosch process.

However, in FIG. 10, since the portion A of the structure supports the electrolyte film 30' at an angle of 90 degrees, when warp is generated in the Si support substrate 20, stress concentration tends to occur at the corner of the portion A. It is considered that the warp is generated, for example, (a) due to a warp generated upon mounting the Si support substrate 20 to a base substrate (not illustrated) by means of an adhesive, or (b) due to a warp generated by upward and downward temperature fluctuation attributable to the difference in the linear expansion coefficient between the Si support substrate 20 and the electrolyte film.

In the case where the stress concentration occurs, when external impact exerts (for example, when a gas pressure exerts on the diaphragm), breakage tends to occur from the portion A. Referring to the SOFC, the operation temperature is at 500 to 700° C. When the SOFC repeats starting and stopping, if there is any portion where the stress is concentrated in the support structure, a crack is generated in the portion, which then leads to breakage. Accordingly, the portion where stress concentration occurs should be eliminated.

Then, as illustrated in FIG. 1, the SOFC 10 according to the present invention has an electrolyte film 30 including a first dense layer 34 for a gas barrier and a porous layer 32 for enhancing the ionic conductivity and keeping the structural strength. Accordingly, even when the external force exerts or upward and downward temperature fluctuation occurs, the porous layer absorbs the stress. As a result, breakage of the electrolyte film is suppressed. Further, since the thickness of the electrolyte film can be decreased with no breakage, low temperature operation is possible and the reliability is also improved. Further, such an electrolyte film is obtained by spin-coating a solution containing alkoxide and applying a heat treatment. In this case, since a dense passivation film is formed at the interface between the Si support substrate and the electrolyte film, there is no need to deposit the silicon nitride as the passivation film on the surface of the Si support substrate. Accordingly, an increase in the manufacturing cost can be suppressed.

Example

[1. Manufacture of Specimen]

In accordance with the following procedures, an electrolyte film including an apatite-type LSO was prepared. An ethanol solution of TEOS was used as a Si source and an aqueous $La(NO_3)_3$ solution was used as a La source. The Si source and the La source were mixed such that La:Si ratio (molar ratio)=4.7:3, to form a coating solution. An Si substrate having a (100) plane orientation (35 mm×35 mm) was used as a substrate. The coating solution was coated on the surface of the Si substrate by using a spin coating method. Then, the Si substrate was subjected to a heat treatment at 400° C. and then cooled to a room temperature. Such coating and heat treatment were repeated by a plurality of times to form a LSO precursor film of a predetermined thickness on the surface of the Si substrate. Further, the Si substrate, to which the LSO precursor film was formed, was subjected to a heat treatment at 900° C. for 2 hours to crystallize a LSO precursor film.

[2. Evaluation]

[2.1. Sem Observation]

Figure 11:
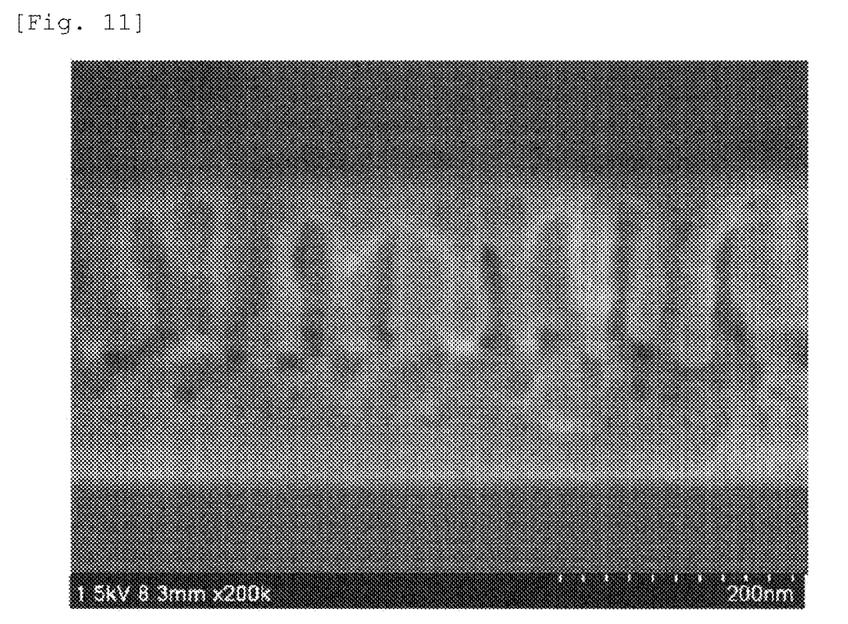
FIG. 11 is a cross sectional SEM image of an electrolyte film including lanthanum silicate oxyapatite (LSO)

FIG. 11 shows a cross sectional SEM image of an electrolyte film including an apatite-type LSO. In view of FIG. 11, it can be seen that an electrolyte film having a first dense layer on the surface and a porous layer inside is formed. The size of a typical pore in the porous layer (pore size) is 36 nm. Further, the volume fraction of the pores is 40%.

[2.2. X-Ray Diffraction]

Figure 12:
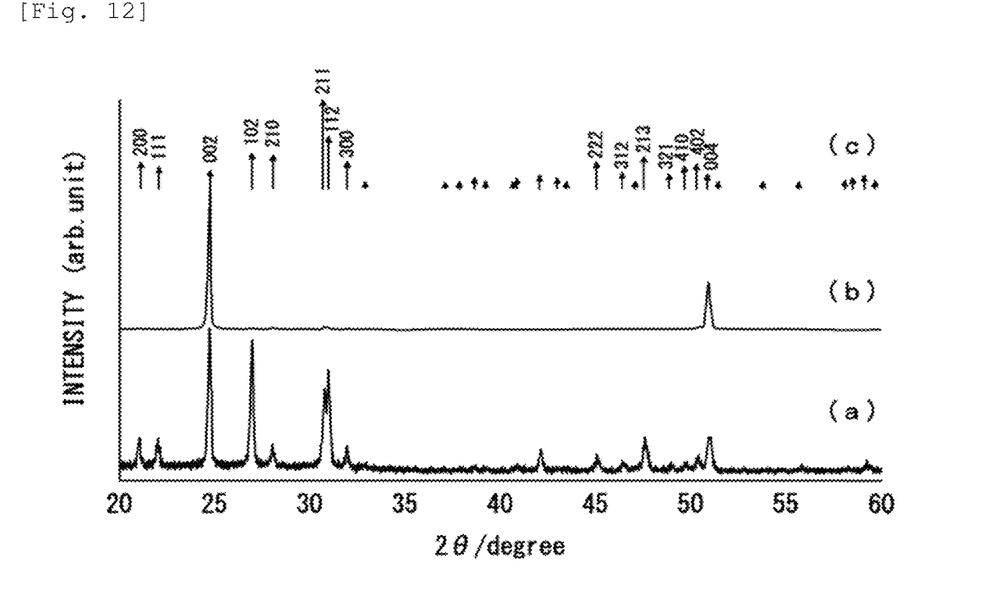
FIG. 12 is an X-ray diffraction pattern of an electrolyte film including lanthanum silicate oxyapatite (LSO).

FIG. 12 shows an X-ray diffraction pattern of an electrolyte film including an apatite-type LSO. In FIG. 12, (a) is an X-ray diffraction pattern of a non-oriented apatite-type LSO synthesized by another method, (b) is an X-ray diffraction pattern of an apatite-type LSO thin film prepared by the method described above, and (c) is a data of a JCPDS card. In view of FIG. 12, it can be seen that, in the apatite-type LSO film prepared by the method described above, the c-axis is oriented in the direction of the film thickness. The Lotgering factor F of the obtained apatite-type LSO film is 0.95.

While the preferred embodiment of the present invention has been described specifically, the present invention is not restricted to the embodiment described above and can be modified variously within a range not departing from the gist of the present invention.

The solid oxide fuel cell according to the present invention can be used as a mobile charger, a power source for a small mobility, a power source for a walk assist robot, etc.

What is claimed is:

1. A solid oxide fuel cell, comprising:
an Si support substrate having a through hole;
an electrolyte film formed on the surface of the Si support substrate and comprising a solid oxide having oxygen ion conductivity;
a first electrode formed on a surface of the electrolyte film that is opposite to the Si support substrate; and
a second electrode formed at least on a surface exposed from the through hole in a rear face of the electrolyte film,
wherein the electrolyte film comprises:
a porous layer comprising the solid oxide and comprising pores inside;
a first dense layer formed on a surface of the porous layer that is opposite to the Si support substrate; and
a second dense layer formed at the interface between a rear face of the porous layer and the Si support substrate.

2. The solid oxide fuel cell according to claim 1, wherein the porous layer comprises the solid oxide having anisotropic oxygen ion conductivity and the crystal orientation of higher oxygen ion conductivity is oriented in the direction of the film thickness.

3. The solid oxide fuel cell according to claim 1, wherein the porous layer comprises a lanthanum silicate oxyapatite where the c-axis is oriented in the direction of the film thickness.

4. The solid oxide fuel cell according to claim 1,
wherein the first dense layer comprises an oxide containing an element identical with that contained in the porous layer, and
the second dense layer comprises $SiO_2$.

* * * * *